United States Patent
Shen et al.

(10) Patent No.: US 10,265,677 B2
(45) Date of Patent: *Apr. 23, 2019

(54) REGENERABLE SORBENT FOR CARBON DIOXIDE REMOVAL

(71) Applicant: RESEARCH TRIANGLE INSTITUTE, Research Triangle Park, NC (US)

(72) Inventors: Jian-Ping Shen, Chapel Hill, NC (US); Luke James Ivor Coleman, Durham, NC (US); Marty Alan Lail, Raleigh, NC (US); Raghubir Prasad Gupta, Durham, NC (US); Brian Scott Turk, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,573

(22) Filed: Oct. 19, 2017

(65) Prior Publication Data

US 2018/0043328 A1     Feb. 15, 2018

Related U.S. Application Data

(62) Division of application No. 14/415,283, filed as application No. PCT/US2013/051257 on Jul. 19, 2013, now Pat. No. 9,808,783.

(Continued)

(51) Int. Cl.
*B01D 53/02*     (2006.01)
*B01D 53/04*     (2006.01)
(Continued)

(52) U.S. Cl.
CPC ............ *B01J 20/043* (2013.01); *B01D 53/02* (2013.01); *B01D 53/62* (2013.01); *B01D 53/82* (2013.01);
(Continued)

(58) Field of Classification Search
None
See application file for complete search history.

(56) References Cited

U.S. PATENT DOCUMENTS 3,489,693 A     1/1970    Bovard
4,433,981 A     2/1984    Slaugh et al.
(Continued)

FOREIGN PATENT DOCUMENTS

WO    WO 2012/033250    3/2012
WO    WO 2012/100149    7/2012
WO    WO 2012/100165    7/2012

*Primary Examiner* — Daniel Berns
(74) *Attorney, Agent, or Firm* — Womble Bond Dickinson (US) LLP

(57) ABSTRACT

A mixed salt composition adapted for use as a sorbent for carbon dioxide removal from a gaseous stream is provided, the composition being in solid form and including magnesium oxide, an alkali metal carbonate, and an alkali metal nitrate, wherein the composition has a molar excess of magnesium characterized by a Mg:X atomic ratio of at least about 3:1, wherein X is the alkali metal. A process for preparing the mixed salt is also provided, the process including mixing a magnesium salt with a solution comprising alkali metal ions, carbonate ions, and nitrate ions to form a slurry or colloid including a solid mixed salt including magnesium carbonate; separating the solid mixed salt from the slurry or colloid to form a wet cake; drying the wet cake to form a dry cake including the solid mixed salt; and calcining the dry cake to form a mixed salt sorbent.

15 Claims, 7 Drawing Sheets

Related U.S. Application Data

(60) Provisional application No. 61/673,626, filed on Jul. 19, 2012.

(51) Int. Cl.
| | |
|---|---|
| *B01D 53/62* | (2006.01) |
| *B01D 53/82* | (2006.01) |
| *B01D 53/96* | (2006.01) |
| *B01J 20/04* | (2006.01) |
| *B01J 20/28* | (2006.01) |
| *B01J 20/30* | (2006.01) |
| *B01J 20/34* | (2006.01) |
| *C10K 1/00* | (2006.01) |
| *C10K 1/26* | (2006.01) |
| *B01D 53/047* | (2006.01) |

(52) U.S. Cl.
CPC ............. *B01D 53/96* (2013.01); *B01J 20/04* (2013.01); *B01J 20/041* (2013.01); *B01J 20/28011* (2013.01); *B01J 20/3078* (2013.01); *B01J 20/3085* (2013.01); *B01J 20/3433* (2013.01); *B01J 20/3483* (2013.01); *B01J 20/3491* (2013.01); *B01D 53/0462* (2013.01); *B01D 53/0476* (2013.01); *B01D 2251/304* (2013.01); *B01D 2251/402* (2013.01); *B01D 2251/602* (2013.01); *B01D 2251/606* (2013.01); *B01D 2253/1124* (2013.01); *B01D 2257/504* (2013.01); *B01D 2258/01* (2013.01); *B01D 2258/025* (2013.01); *B01D 2258/0241* (2013.01); *B01D 2258/0283* (2013.01); *B01J 2220/42* (2013.01); *C10K 1/005* (2013.01); *C10K 1/26* (2013.01); *Y02C 10/04* (2013.01); *Y02C 10/08* (2013.01); *Y02C 20/20* (2013.01); *Y02P 20/152* (2015.11)

(56) References Cited

U.S. PATENT DOCUMENTS

| | | |
|---|---|---|
| 5,480,625 A | 1/1996 | Nalette et al. |
| 5,520,894 A | 5/1996 | Heesink et al. |
| 5,681,503 A | 10/1997 | Nalette et al. |
| 6,280,503 B1 | 8/2001 | Mayorga et al. |
| 6,387,337 B1 | 5/2002 | Pennline et al. |
| 6,387,845 B1 | 5/2002 | Masahiro et al. |
| 7,314,847 B1 | 1/2008 | Siriwardane |
| 8,110,523 B2 | 2/2012 | Ryu et al. |
| 9,180,401 B2 | 11/2015 | Hamad |
| 9,539,541 B2 | 1/2017 | Hamad et al. |
| 2004/0144251 A1 | 7/2004 | Mitsuda |
| 2011/0158874 A1 | 6/2011 | Smedley et al. |
| 2011/0293509 A1 | 12/2011 | Cobden |
| 2013/0298532 A1 | 11/2013 | Hamad et al. |
| 2014/0120017 A1 | 5/2014 | Sceats |

REGENERABLE SORBENT FOR CARBON DIOXIDE REMOVAL

CROSS-REFERENCE TO RELATED APPLICATIONS

This is a divisional application of U.S. application Ser. No. 14/415,283, filed on Jan. 16, 2015, which is a national stage filing under 35 U.S.C. 371 of PCT/US2013/051257, filed Jul. 19, 2013, which International Application was published by the International Bureau in English on Jan. 23, 2014, and claims priority from U.S. Provisional Application No. 61/673,626, filed on Jul. 19, 2012, which applications are hereby incorporated in their entirety by reference in this application.

FIELD OF THE INVENTION

The invention relates to a regenerable solid sorbent material suitable for $CO_2$ capture from a gaseous stream, particularly exhaust gas streams characterized by relatively high temperatures and relatively low $CO_2$ partial pressures, as well as processes and systems using such a sorbent and methods of making such a sorbent.

BACKGROUND OF THE INVENTION

Combustion of fossil fuels is reported to be a major cause of the increased concentration of carbon dioxide ($CO_2$) in the atmosphere. Although research is ongoing to improve energy efficiency and to substitute low-carbon fuels to combat this problem, these methods will likely be insufficient to limit the growth of atmospheric $CO_2$ concentrations to an acceptable level. As a result, there is tremendous interest in the development of methods for preventing $CO_2$ release into the atmosphere, i.e., carbon capture and storage (CCS) technology.

A number of technologies are available for removing $CO_2$ from a gaseous stream, including wet chemical absorption with a solvent (e.g., using amines such as monoethanolamine or diethanolamine), membrane separation, cryogenic fractionation, and adsorption using molecular sieves. Another method for the removal of $CO_2$ from a gas stream involves dry scrubbing, meaning treatment of the process gas with a dry, regenerable sorbent that removes $CO_2$ by chemical absorption/adsorption.

Existing technologies for $CO_2$ capture from gaseous streams suffer from a number of drawbacks. The Department of Energy has reported that existing $CO_2$ capture technologies are not cost-effective when considered in the context of large power plants. The net electricity produced from existing plants would be significantly reduced upon implementation of many of these $CO_2$ capture technologies, since a high percentage of the power generated by the plant would have to be used to capture and compress the $CO_2$. Additionally, the process conditions under which the $CO_2$ must be removed in many applications render the existing technologies unusable. For example, exhaust gas streams including automotive exhaust, cement kiln flue gas, steel mill flue gas, diesel generator exhaust, and many other industrial and process gas streams are simply too hot (up to 600° C.) for conventional post-combustion $CO_2$ capture technologies. Still further, the $CO_2$ partial pressure of these gas streams is too low, typically less than 14.7 psia $CO_2$, for natural gas sweetening or syngas $CO_2$ capture technologies to be effective. The combination of high temperatures and low $CO_2$ partial pressures makes the development of a material capable of effectively removing $CO_2$ from these gas streams a significant challenge.

U.S. Pat. Nos. 5,480,625 and 5,681,503 are directed to sorbents for removing carbon dioxide from habitable enclosed spaces, the sorbents including a metal oxide (e.g., silver oxide) as the active agent and an alkali metal carbonate. However, the only exemplified sorbent regeneration temperature range given is 160-220° C., too low to be useful for most exhaust gas applications.

U.S. Pat. No. 6,280,503 describes a solid sorbent comprising magnesium oxide, preferably promoted with an alkali metal carbonate or alkali metal bicarbonate, for removal of $CO_2$ from gas streams at temperatures in the range of 300 to 500° C.

U.S. Pat. No. 6,387,337 describes a $CO_2$ capture system that utilizes a sorbent in the form of an alkali metal compound or an alkaline-earth metal compound, and that purportedly operates over a temperature range of 200 to 2000° F.

U.S. Pat. No. 6,387,845 is directed to a $CO_2$-absorbing sorbent comprising lithium silicate optionally promoted by addition of an alkali metal carbonate, and which is capable of operation at temperatures exceeding about 500° C.

U.S. Pat. No. 7,314,847 is directed to a regenerable sorbent for $CO_2$ capture that includes a binder in combination with one or more active components selected from alkali metal oxide, alkali metal hydroxide, alkaline earth metal oxide, alkaline earth metal hydroxide, alkali titanate, alkali zirconate, and alkali silicate. The sorbents are described as capable of operation over a temperature range of 25 to 600° C.

U.S. Pat. No. 8,110,523 describes a sorbent for $CO_2$ capture that comprises an alkali metal carbonate or bicarbonate combined with a high surface area support and a binder. The patent suggests that the sorbent can operate over a temperature range of 40-200° C.

There is a continuing need in the art for the development of a sorbent material that is capable of effectively removing $CO_2$ from gaseous streams, particularly exhaust gas streams characterized by relatively high temperatures and relatively low $CO_2$ partial pressures.

SUMMARY OF THE INVENTION

The present invention provides a mixed salt composition adapted for use as a sorbent for carbon dioxide removal from a gaseous stream, the composition being in solid form and comprising i) magnesium oxide; ii) an alkali metal carbonate; and iii) an alkali metal nitrate, wherein the composition has a molar excess of magnesium characterized by a Mg:X atomic ratio of at least about 1.1:1, wherein X is the alkali metal. The sorbent is suitable for removing carbon dioxide from a wide range of $CO_2$-containing gaseous streams, and is particularly well-suited for $CO_2$ scrubbing of exhaust gases characterized by low $CO_2$ partial pressure and moderately high temperature. In one embodiment, a pellet of the sorbent of the invention has a crush strength, as determined by the Shell method, of at least about 0.3 MPa.

In certain embodiments, the alkali metal comprises sodium. The Mg:X atomic ratio can vary, but will often be at least about 4:1 or at least about 6:1. The alkali metal nitrate is typically present in an amount of at least about 1% by weight, based on total dry weight of the mixed salt composition. An exemplary sorbent mixture is $MgO:Na_2CO_3:NaNO_3$.

The invention also provides a method for removing carbon dioxide from a gaseous stream, comprising contacting a gaseous stream containing carbon dioxide with a sorbent material comprising the mixed salt composition of the invention. In certain embodiments, the contacting step occurs at a temperature of about 100° C. to about 450° C. (e.g., about 250° C. to about 375° C.) and a carbon dioxide partial pressure in the gaseous stream of about 1 to about 300 psia. In one embodiment, the gaseous stream has a low carbon dioxide partial pressure, such as less than about 20 psia (e.g., less than about 14 psia, less than about 10 psia, less than about 5 psia, or less than about 3 psia). In one embodiment, the sorbent material exhibits a $CO_2$ loading of at least about 10 weight percent $CO_2$ at an absorption temperature of about 250 to about 350° C.

The type of absorber housing the sorbent of the invention is not particularly limited, and can include, for example, either a fixed bed or fluidized bed absorber. The sorbent is regenerable, meaning the sorbent can be treated to cause desorption of carbon dioxide and reused. The regenerating step can vary, with exemplary regeneration processes including pressure-swing absorption, temperature-swing absorption, or a combination thereof. The regenerating step will often include raising the temperature of the sorbent material or lowering the pressure applied to the sorbent material, as compared to the temperature and pressure during the contacting step. In the case of pressure swing absorption, the total pressure may remain constant or near constant while the partial pressure of $CO_2$ is lowered, such as by purging with steam.

In a further aspect, the invention provides a process for preparing the mixed salt composition of the invention, the process comprising: mixing a magnesium salt with a solution containing alkali metal ions, carbonate ions, and optionally nitrate ions, to form a slurry or colloid comprising a solid mixed salt comprising magnesium carbonate; separating the solid mixed salt from the slurry or colloid to form a wet cake of the solid mixed salt; drying the wet cake to form a dry cake comprising the solid mixed salt; and calcining the dry cake to form a mixed salt composition according to the invention.

The mixing step can comprise mixing a first solution containing a dissolved alkali metal carbonate, and optionally a dissolved alkali metal nitrate, and a second solution containing a dissolved magnesium salt to form the solid mixed salt as a co-precipitate. In advantageous embodiments, the magnesium salt used in the co-precipitation process is highly water soluble, such as magnesium salts having a water solubility of at least about 10 g per 100 ml at 25° C. and one atmosphere, or at least about 40 g per 100 ml. Exemplary water soluble magnesium salts include magnesium nitrate, magnesium acetate, and magnesium chloride. The carbonate ions in the solution are typically derived from a precipitating salt comprising a carbonate ion added to the solution (e.g., an alkali metal carbonate or ammonium carbonate).

Alternatively, the mixing step can include combining a solid magnesium salt (e.g., basic magnesium carbonate) with the solution to form the solid mixed salt as a colloid. In one embodiment, a solid magnesium salt is combined with a solution containing a dissolved alkali metal carbonate and a dissolved alkali metal nitrate to form the solid mixed salt as a colloid.

BRIEF DESCRIPTION OF THE DRAWINGS

Figure 1:
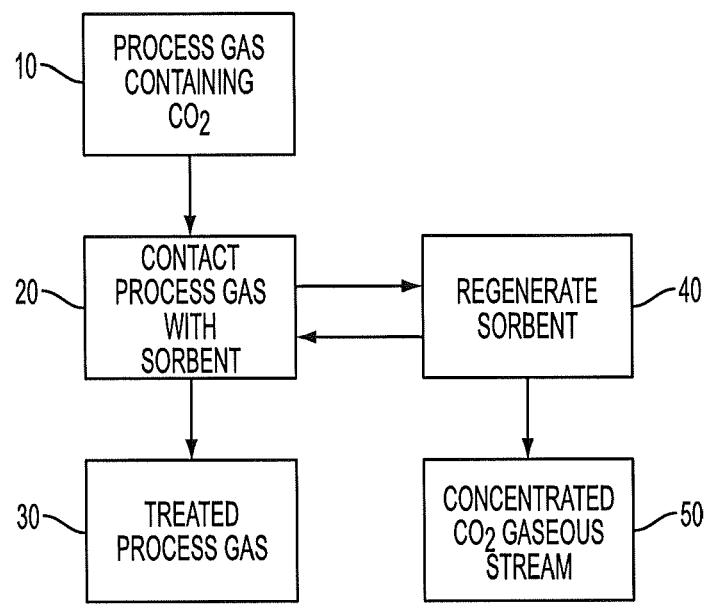
Figure 2:
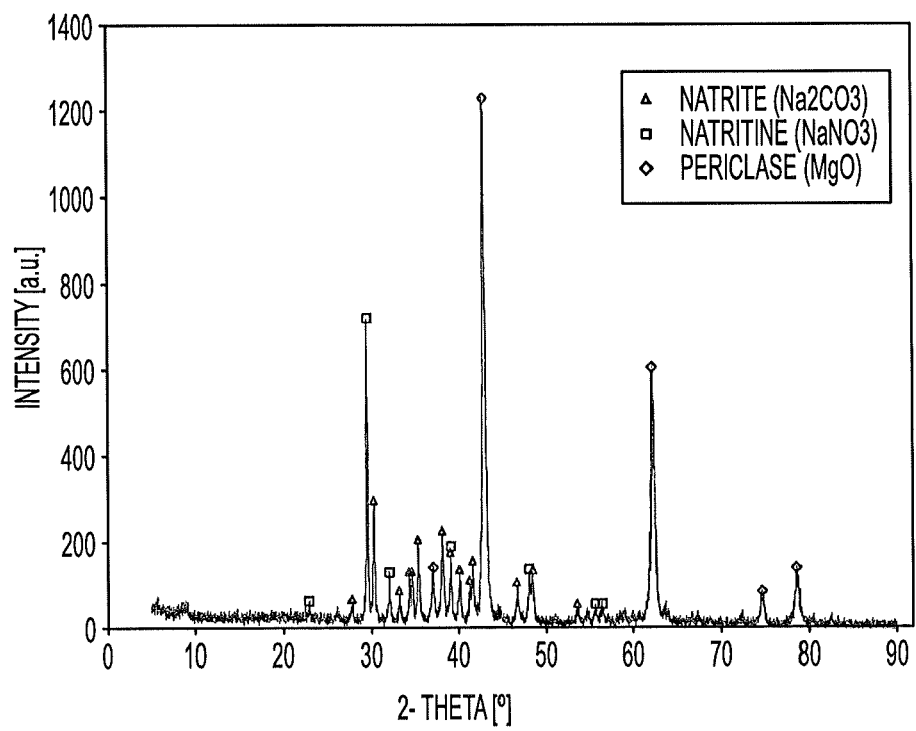
Figure 3:
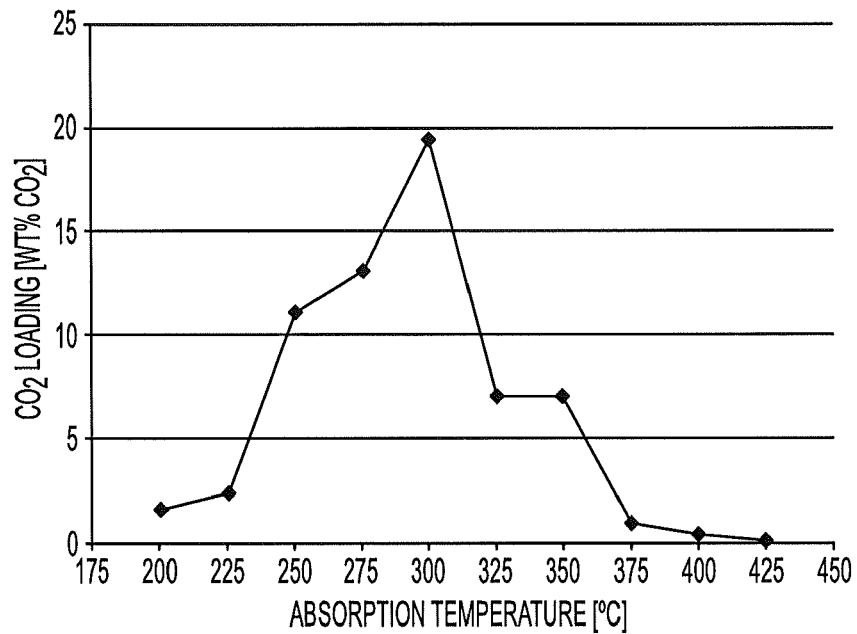
Figure 4:
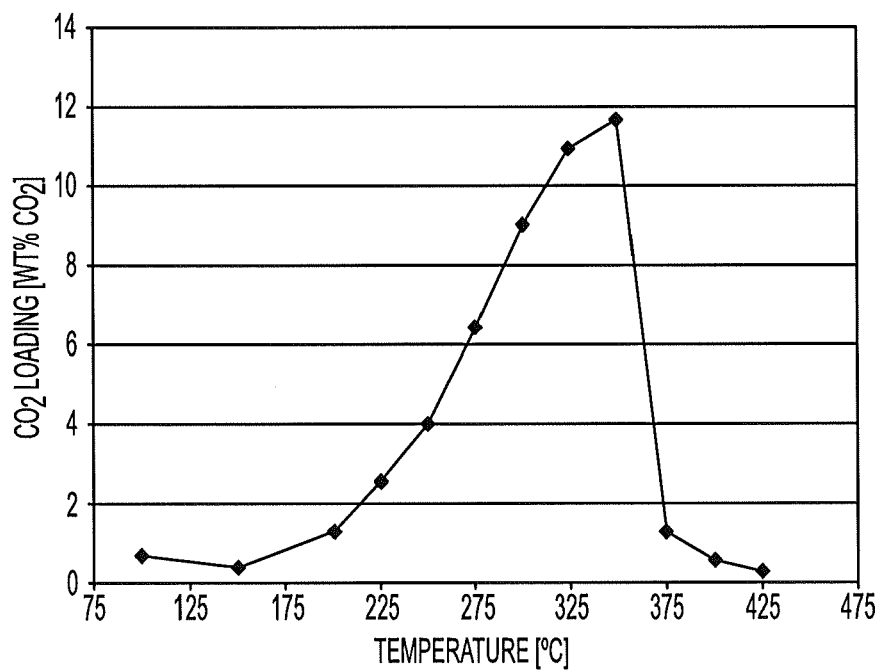
Figure 5:
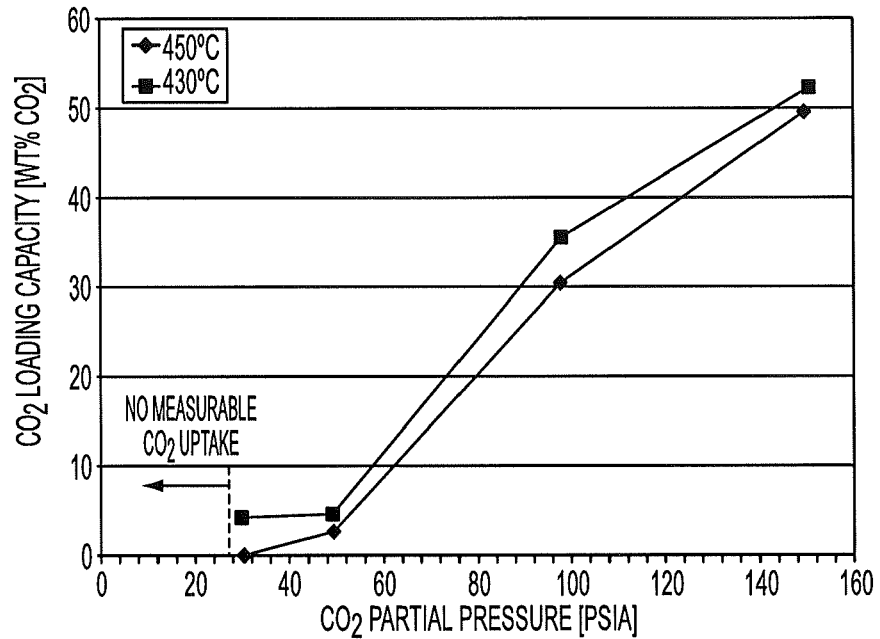
Figure 6:
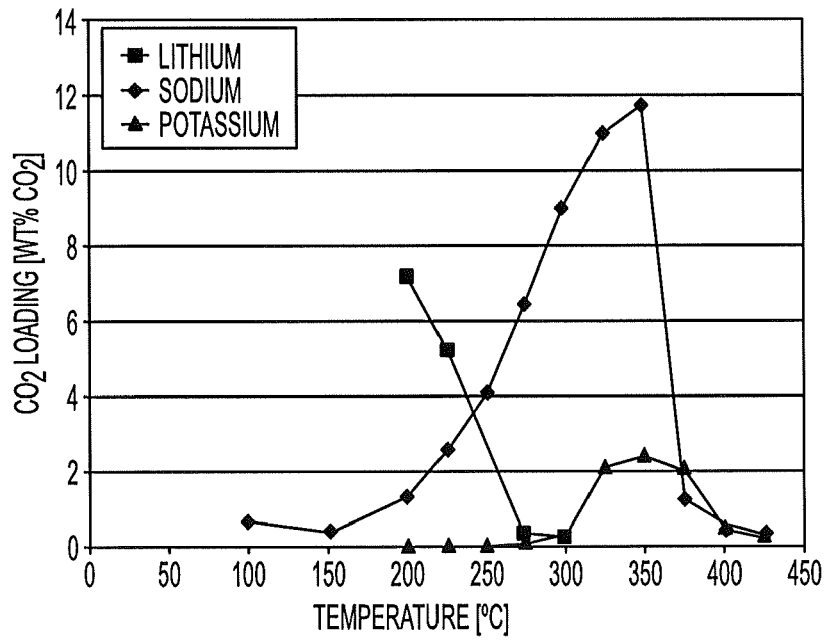
Figure 7:
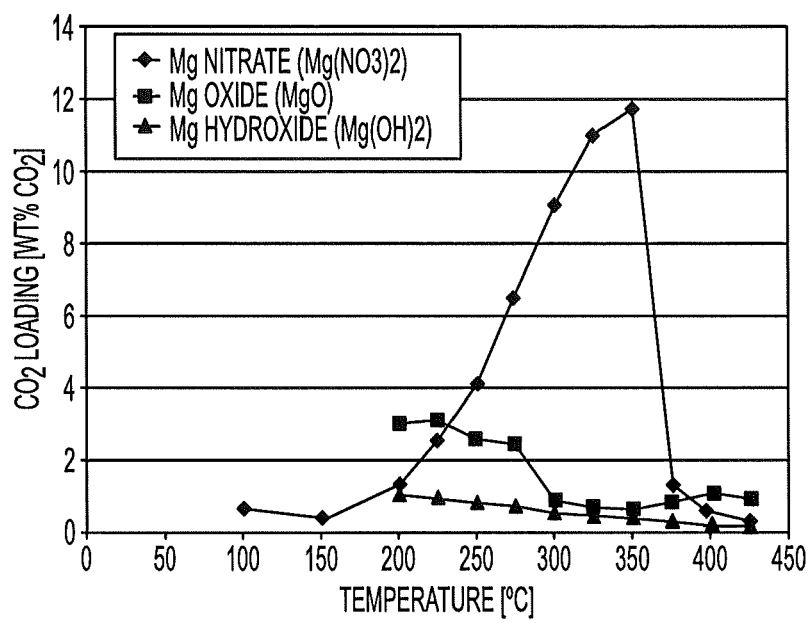
Figure 8:
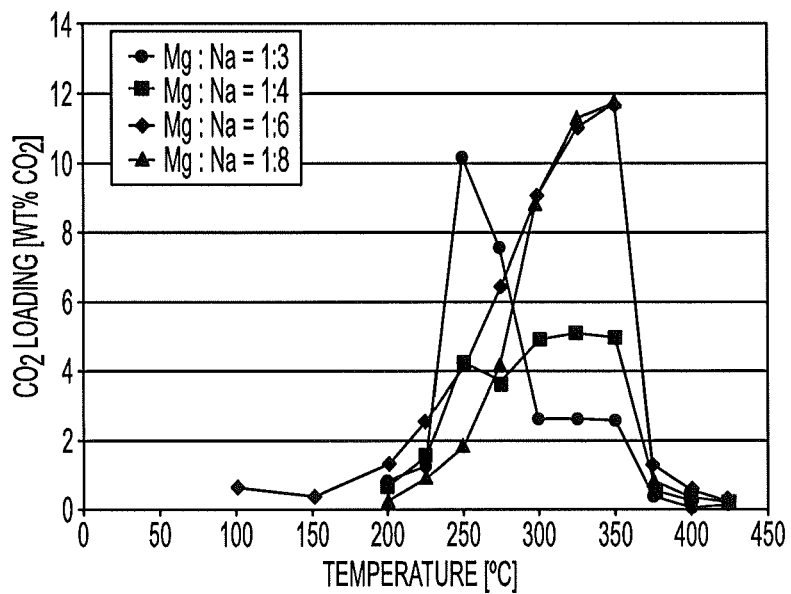
Figure 9:
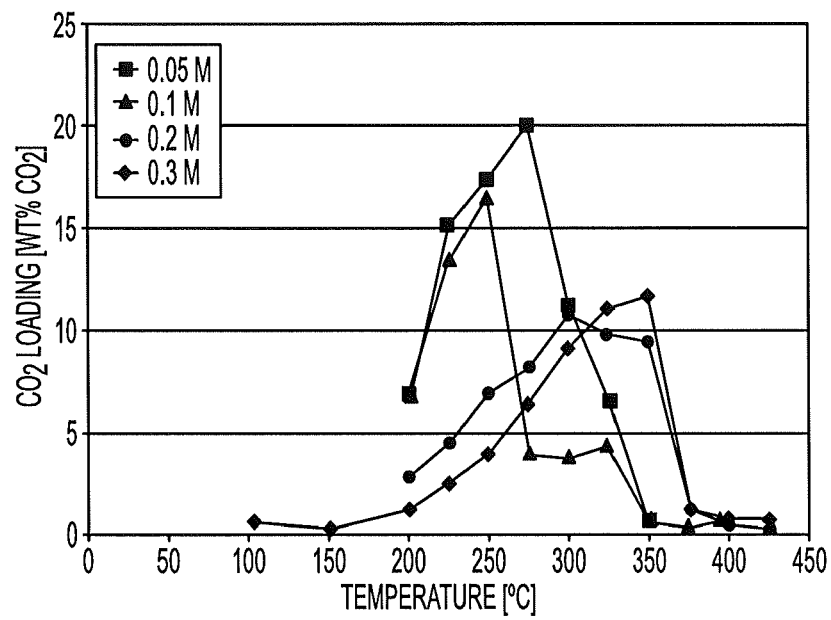
Figure 10:
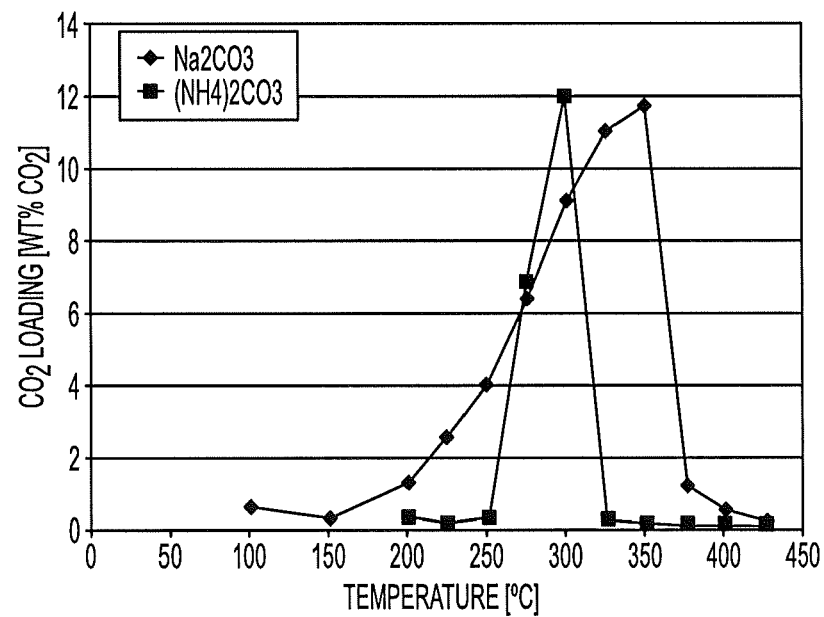
Figure 11:
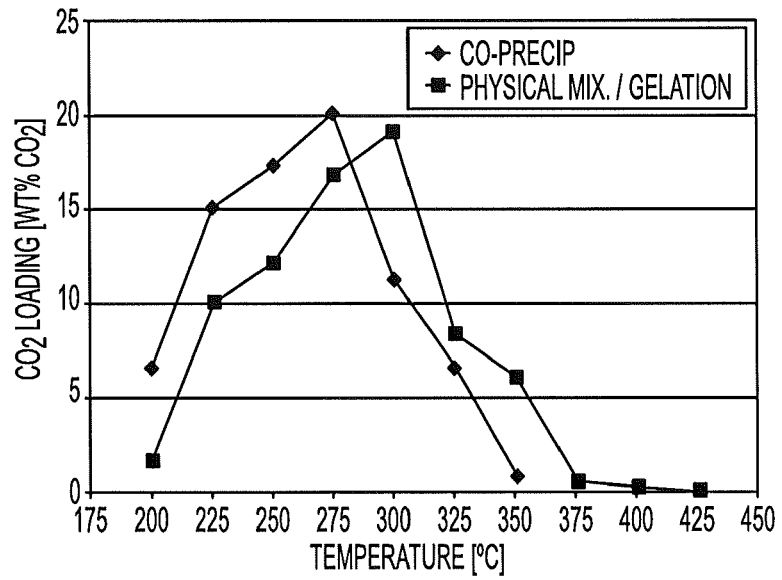
Figure 12:
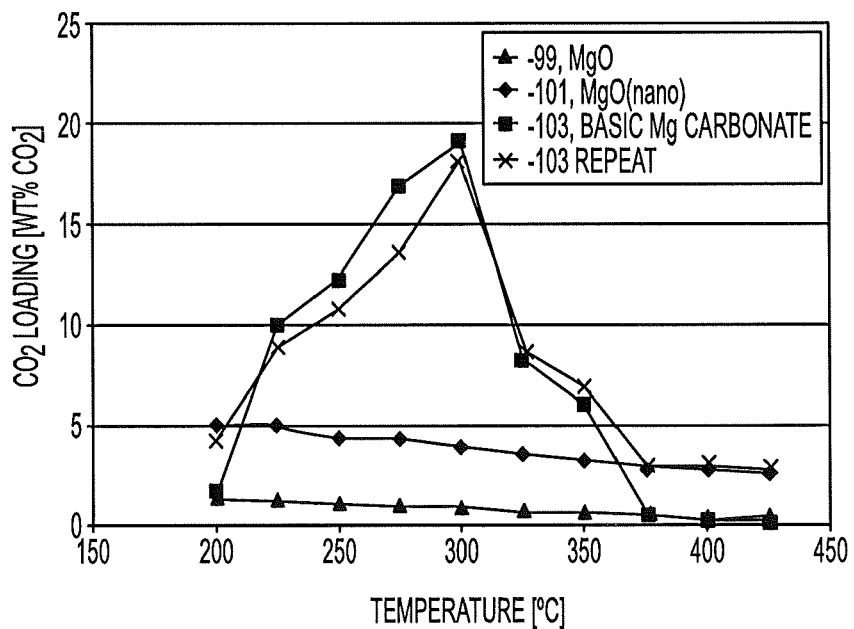
Figure 13:
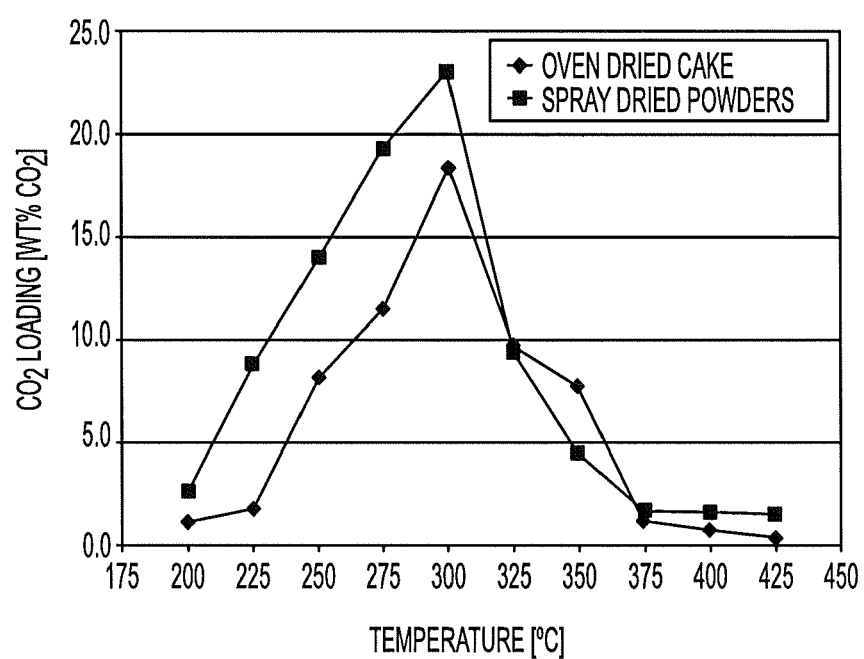

Having thus described the invention in general terms, reference will now be made to the accompanying drawings, which are not necessarily drawn to scale, and wherein:

FIG. 1 is a flow chart illustrating a process for using the sorbent of the invention to remove $CO_2$ from a gas stream;

FIG. 2 is an x-ray powder diffraction (XRD) pattern of a prepared sorbent according to the invention showing the desired $MgO:Na_2CO_3:NANO_3$ composition;

FIG. 3 graphically illustrates the $CO_2$ loading characteristics at different temperatures for the sorbent prepared in Example 1 using a low $CO_2$ partial pressure feed gas;

FIG. 4 graphically illustrates the $CO_2$ loading characteristics at different temperatures for the sorbent prepared in Example 2 using a low $CO_2$ partial pressure feed gas;

FIG. 5 graphically illustrates the $CO_2$ loading characteristics at two temperatures for the sorbent prepared in Example 1 using a feed gas of varying $CO_2$ partial pressure;

FIG. 6 graphically illustrates the effect of alkali metal selection on $CO_2$ loading characteristics of a sorbent according to the invention;

FIG. 7 graphically illustrates the effect of magnesium salt selection on $CO_2$ loading characteristics of a sorbent according to the invention;

FIG. 8 graphically illustrates the effect of Mg:Na atomic ratio in the reagent mixture on $CO_2$ loading characteristics of a sorbent according to the invention;

FIG. 9 graphically illustrates the effect of precipitation solution concentration on $CO_2$ loading characteristics of a sorbent according to the invention;

FIG. 10 graphically illustrates the effect of precipitating agent selection on $CO_2$ loading characteristics of a sorbent according to the invention;

FIG. 11 graphically illustrates the effect of production method on $CO_2$ loading characteristics of a sorbent according to the invention;

FIG. 12 graphically illustrates the effect of magnesium oxide source in a gelation production method on $CO_2$ loading characteristics of a sorbent according to the invention; and FIG. 13 graphically illustrates the effect of drying process selection on $CO_2$ loading characteristics of a sorbent according to the invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements. As used in the specification, and in the appended claims, the singular forms "a", "an", "the", include plural referents unless the context clearly dictates otherwise.

The present invention provides a mixed salt composition adapted for use as a sorbent for carbon dioxide removal from a gaseous stream, the composition being in solid form and comprising magnesium oxide; an alkali metal carbonate; and an alkali metal nitrate, wherein the composition has a molar excess of magnesium characterized by a Mg:X atomic ratio of at least about 1.1:1, wherein X is the alkali metal. Exemplary ranges of Mg:X atomic ratio include at least about 2:1, at least about 3:1, at least about 4:1, at least about 5:1, at least about 6:1, at least about 7:1, and at least about 8:1. Note that the two alkali metal salts in the sorbent will typically comprise the same alkali metal (e.g., sodium), although mixtures of different alkali metals could be used without departing from the invention. One embodiment of the sorbent of the invention is the mixture $MgO:Na_2CO_3:NaNO_3$. Although not bound by a theory of operation, it is believed that the sorbent of the invention loads $CO_2$ in the form of magnesium carbonate ($MgCO_3$), while the alkali metal component of the sorbent promotes the reactions through which $CO_2$ is captured by the sorbent. Other acid gas components of a process gas stream can also be removed using the sorbent of the invention, such as $H_2S$, COS, $SO_2$, $NO_X$ species, and the like. In some cases, these acid gases may be irreversibly absorbed.

The relative amount of Mg and alkali metal can be characterized in terms of mass. In certain embodiments, the mixed salt sorbent comprises at least about 60% by weight magnesium oxide (based on total dry weight of the mixed salt composition), more often at least about 70%, at least about 75%, or at least about 80% by weight magnesium oxide (e.g., a MgO weight range of about 70% to about 90%). In certain embodiments, the mixed salt sorbent comprises at least about 8% by weight of alkali metal carbonate (e.g., sodium carbonate), based on total dry weight of the mixed salt composition, such as at least about 10% by weight, at least about 12% by weight, or at least about 14% by weight (e.g., an alkali metal carbonate weight range of about 8% to about 18%). In certain embodiments, the mixed salt sorbent comprises at least about 1% by weight of alkali metal nitrate (e.g., sodium nitrate), based on total dry weight of the mixed salt composition, such as at least about 2% by weight, at least about 3% by weight, or at least about 5% by weight (e.g., an alkali metal nitrate weight range of about 1% to about 10%).

As used herein, "magnesium salt" refers to an ionic compound comprising magnesium as a cation. "Alkali metal salt" refers to an ionic compound comprising an alkali metal as the cation. The alkali metal (i.e., a Group 1 element, formerly known as Group IA elements) can vary, and expressly includes lithium, sodium, potassium, rubidium, caesium, and francium. The anions associated with either the magnesium salts or alkali metal salts can vary, with specific examples including carbonate, acetate, chloride, hydroxide, oxide, and nitrate groups.

The mixed salt sorbent of the invention can be characterized by $CO_2$ loading ability. Certain embodiments of the sorbent of the invention are capable of achieving $CO_2$ loading of at least about 10 weight percent $CO_2$, at least about 15 weight percent $CO_2$, at least about 20 weight percent $CO_2$, or at least about 25 weight percent $CO_2$ (e.g. about 10 to about 30 weight percent $CO_2$). Although the composition of the sorbent can impact peak absorption temperature, in one embodiment, the above-noted $CO_2$ loading levels are achieved at an absorption temperature in the range of about 250 to about 350° C.

The sorbent composition is typically used in a particulate form with a particle size of about 150-425 mesh, although other particle size ranges could be used without departing from the invention. In certain embodiments, the sorbent composition can include additional components. For example the sorbent can include one or more inert binders for various purposes, such as to facilitate granulation or extrusion, improve handling, enhance particle strength, or reduce pressure drop across packed sorbent beds. Exemplary binders include alkali silicates, inorganic clays, boehmite, and organic binders (e.g., starch, cellulosic polymers such as methylcellulose, polyvinyl acetate, and lignin sulfonate). Binders used in the present invention should be chemically stable at the operating temperature of the sorbent (e.g., about 100 to about 450° C.). In some cases, certain binders are detrimental to the performance of the sorbent. For example, it has been determined that the use of boehmite is generally disadvantageous because the presence of boehmite reduces $CO_2$ loading performance, presumably due to interaction between the alkali metal promoter of the sorbent and the boehmite.

Certain binders, such as methylcellulose, can impart porosity to the final sorbent composition. Organic binders of this type are removed during the calcinations step, leaving a pore network within the sorbent extrudate.

Although some binder materials can also enhance particle strength of sorbents, it has been determined that the sorbent of the invention may not require a binder to enhance particle strength because the crush strength of the sorbent of the invention made without binder was found to be approximately equivalent to a sorbent composition of the invention that included a boehmite binder. The crush strength of a pellet (i.e., extrudate) of the sorbent of the invention, as determined by the Shell method, is typically at least about 0.3 MPa, at least about 0.4 MPa, or at least about 0.5 MPa (e.g., a crush strength range of about 0.3 MPa to about 1 MPa).

The sorbent composition of the invention can further include a porous material as a carrier for the mixed salt composition. Exemplary porous carriers include bauxite, activated carbon, clays (e.g., amorphous, crystalline, or mixed layer clays), metal oxides (e.g., iron oxide, alumina, magnesium oxide, and zirconium oxide), magnesium silicate, molecular sieves, silica gel, and zeolites.

Although the sorbent of the invention has a large molar excess of Mg over alkali metal, the initial reagent mixture used to produce the final product will typically exhibit a molar excess of alkali metal. As the alkali metal is more soluble in water, more of the alkali metal will remain in solution during the reactions that lead to formation of the final mixed salt composition, and more alkali metal is lost during steps taken to effect separation of the solid mixed salt from the solution (e.g., filtration or washing steps).

As shown in Example 9, the extent of the molar excess of the alkali metal over the magnesium in the initial reagent mixture used in the co-precipitation method can vary, and will impact the level of $CO_2$ loading and optimal absorption temperature for the sorbent. Greater alkali metal content in terms of Mg:X atomic ratio, such as greater than about 1:3, greater than about 1:4, greater than about 1:5, greater than about 1:6, greater than about 1:7, or greater than about 1:8, tend to increase both the maximum $CO_2$ loading capacity of the sorbent as well as the optimal absorption temperature. Lower molar excesses may be appropriate where a lower absorption temperature is desirable. A typical molar excess range for the co-precipitation method is an Mg:X ratio of about 1:3 to about 1:10 for the initial reagent mixture.

The mixed salt sorbent compositions of the invention can be made by any process that facilitates formation of a solid mixed salt from solution (e.g., co-precipitation or gelation/colloid processes). The salts used in the process are chosen such that, upon reaction, $MgCO_3$ is formed in the precipitate. The process of the invention will typically involve mixing a magnesium salt and an alkali metal salt in the presence of carbonate and nitrate ions in solution. The carbonate ions are typically provided by a precipitating agent in order to drive formation of the desired magnesium salt. The precipitating agent and the alkali metal salt can be the same reagent in some embodiments, meaning the alkali metal salt is a carbonate salt, thereby providing both the necessary alkali metal content and carbonate ions. In a typical co-precipitation process, both the magnesium salt and the alkali metal salts are provided in a dissolved form and the solutions of each salt are combined and mixed, which produces the desired precipitate of the mixed salt sorbent of the invention. The mixing step typically comprises mixing a first solution containing dissolved alkali metal carbonate and nitrate salts (e.g., sodium carbonate and sodium nitrate) and a second solution containing a dissolved magnesium salt (e.g., magnesium nitrate) to form the solid mixed salt of the invention as a co-precipitate.

The carbonate ions in the solution are derived from a precipitating salt comprising a carbonate ion added to the solution. As noted above, the alkali metal salt itself can be the source of carbonate ions (e.g., sodium carbonate), or other sources of carbonate ions can be used in addition to the alkali metal salt (e.g., ammonium carbonate). At least one of the salts mixed in the mixing step is a nitrate salt and at least one of the salts mixed in the mixing step is a carbonate salt. In addition to reagent-grade alkali metal salts that are commercially available, commercial-grade reagents can also be used in some cases, such as the use of soda ash as a sodium carbonate source.

As noted in Example 8 below, the water solubility of the magnesium salt used in the co-precipitation process can have a significant impact on the performance of the sorbent, both in terms of maximum $CO_2$ loading and optimal absorption temperature. The use of magnesium salts with higher water solubility levels enhance $CO_2$ loading. In certain embodiments, the water solubility of the magnesium salt is at least about 10 g per 100 ml (at 25° C. and one atmosphere), or at least about 40 g per 100 ml. Exemplary water soluble magnesium salts include magnesium nitrate, magnesium acetate, and magnesium chloride.

Co-precipitation processes where each salt is initially in solution can be difficult to scale up because of the large quantity of solvent required. Accordingly, in certain embodiments, the mixed salt sorbent is formed by a process where at least one of the salt components (typically the magnesium salt) is added in solid form to a solution of the other salts (typically the alkali metal salts), resulting in colloidal gelation of the desired mixed salt sorbent of the invention. Such a process forms a stable colloid of the desired solid mixed salt dispersed in the solution. It has been determined that the gelation process described herein can be used to scale up production (e.g., to 300 g batch size) of the sorbent of the invention without losing carbon dioxide capture performance.

In one embodiment of the gelation process, a solid magnesium salt such as basic magnesium carbonate (e.g., magnesium carbonate hydroxide having the formula $4MgCO_3 \cdot Mg(OH)_2 \cdot xH_2O$), which is essentially water-insoluble, is mixed with a solution containing alkali metal ions, carbonate ions, and nitrate ions. The solution will typically comprise a dissolved alkali metal carbonate (and/or other carbonate ion sources) and a dissolved alkali metal nitrate. Mixing the solid magnesium salt with the dissolved alkali metal solution results in liquid-solid reactions, and ultimately, formation of a stable colloid of the desired mixed salt sorbent material dispersed in the solution. In the gelation process, the formation of the desired mixed salt product proceeds in a manner similar to a sol-gel process, with the mixed salt product forming as a dispersed, stable colloidal phase or network within the solution. It is noted that the manner in which the solid magnesium salt is contacted with the solution of alkali metal ions, carbonate ions, and nitrate ions can vary. Powders of the magnesium salt and various alkali metal salts (e.g., sodium carbonate and sodium nitrate) can be premixed in dry form using milling/grinding techniques known in the art and then combined with water to create the desired solution. Alternatively, the solution of alkali metal ions, carbonate ions, and nitrate ions can be prepared first, followed by addition of the solid magnesium salt.

In either a colloid or co-precipitation process, the process steps typically involve:
 i) mixing a magnesium salt with a solution containing alkali metal ions, carbonate ions, and nitrate ions to form a slurry or colloid comprising a solid mixed salt, wherein the mixture of the alkali metal salt with the magnesium salt in solution has a molar excess of alkali metal characterized by a Mg:X atomic ratio of at least about 1:3, wherein X is the alkali metal;
 ii) separating the solid mixed salt from the slurry or colloid to form a wet cake of the solid mixed salt;
 iii) drying the wet cake to form a dry cake comprising the solid mixed salt; and
 iv) calcining the dry cake to form a mixed salt sorbent composition according to the invention.

The separating and drying steps can be conducted using any conventional separation and drying equipment and techniques known in the art. Typical separating steps include centrifugation and/or filtration, optionally accompanied by one or more washing steps. Exemplary drying equipment includes spray dryers, rotary dryers, flash dryers, conveyer dryers, fluid bed dryers, and the like. The temperature and time of the drying step can vary, depending on the desired moisture content of the dried cake. A typical temperature range is about 50° C. to about 150° C. and a typical drying time is about 2 to about 24 hours.

Following drying, the dried cake is preferably subjected to a calcining step. This step enhances the $CO_2$ loading capacity of the sorbent. Calcining temperatures and times can vary depending on the desired final characteristics of the sorbent, but will typically involve a maximum temperature in the range of 400 to 500° C. and a time of about 2 to about 10 hours. The calcining is conducted by ramping up the temperature of the sorbent at a ramp rate of, for example, about 1 to about 5° C. per minute. Following calcining, the mixed salt composition will be in dry powder form. The particle size of the powder can be adjusted as desired using milling or grinding equipment known in the art.

The sorbent powder can also be optionally combined with a binder and extruded before final processing into the desired granule size. The extruding step can also occur before calcination so that the calcinations process drives off any organic binder material present in the final sorbent extrudate. Still further, the sorbent powder can be admixed with a porous carrier using known techniques in the art, such as by mixing the porous carrier with a slurry of the sorbent powder followed by drying of the treated carrier. In addition, the sorbent material can be slurried and spray-dried to form fluidizable particles.

If a sorbent extrudate is formed, the drying procedure used for the extrudate can impact the crush strength of the extrudate pellet. Crush strength declines with increases in drying rate. Accordingly, allowing the extrudate to remain at room temperature before subjecting the sorbent to higher temperatures is advantageous. Further, lower ramp rates during drying are useful to reduce the impact of drying on crush strength, such as temperature ramp rates of less than about 0.5° C./min, or less than about 0.4° C./min, or less than about 0.3° C./min.

The mixed salt sorbent composition of the invention can be used to remove carbon dioxide from a gaseous stream by contacting a gaseous stream containing carbon dioxide with a sorbent material comprising the mixed salt composition of the invention for a time and at a temperature sufficient for the sorbent to remove all or a portion of the $CO_2$ from the process gas stream. The process of using the sorbent is set forth schematically in FIG. 1. A process gas containing $CO_2$ is received in step 10 and contacted with the sorbent of the invention in step 20. A treated process gas having a reduced $CO_2$ content can be withdrawn in step 30. The sorbent will eventually become saturated with $CO_2$ and require regeneration as noted in step 40, which usually involves passing an inert gas through the sorbent and changing the temperature or pressure conditions of the sorbent to facilitate desorption of $CO_2$ from the sorbent. The regeneration step may result in production of a concentrated $CO_2$ gaseous stream in step 50. However, if a high quality $CO_2$ product gas is not desired, a highly diluted $CO_2$ gaseous stream may be produced by purging with a hot gas such as steam or air or another diluent.

The process gas to be treated according to the invention can vary. Any gaseous mixture comprising $CO_2$ where it is desired to reduce the $CO_2$ concentration of the gaseous mixture would be suitable for use in the present invention. Exemplary process gases include any exhaust gas from a fossil fuel combustion process (e.g., exhaust flue gas streams produced by fossil fuel-fired power plants including industrial boilers, exhaust from vehicles with internal combustion engines, cement kiln flue gas, steel mill flue gas, glass manufacturing flue gas, and diesel generator exhaust) or a syngas produced by the gasification of coal or reforming of natural gases. The sorbent of the invention could be used, for example, in advanced power systems such as Integrated Gasification Combined Cycle (IGCC), Low-Emissions Boiler Systems (LEBS), High Performance Power Systems (HIPPS), and Pressurized Fluid Bed Combustors (PFB).

Of particular interest are chemical conversion processes in which $CO_2$ is an undesirable by-product or a contaminant, such as the conversion of warm syngas to hydrogen, such as in the context of hydrogen production from syngas derived from coal, biomass, or natural gas for power generation (for example in a gas turbine); hydrogen production for chemical conversions such as ammonia; or syngas production with desired ratio of $H_2$-to-CO for production of methanol and Fischer Tropsch products. Incorporating the sorbent of the invention into a syngas treatment process could consist of stand-alone $CO_2$ removal from syngas, water-gas shift of syngas followed by $CO_2$ removal using the sorbent of the invention, or simultaneous water-gas shift of syngas and $CO_2$ removal known as sorption-enhanced water-gas shift. Additional uses of the sorbent of the invention could include use in the process of direct conversion (i.e., reforming and partial oxidation) of carbonaceous fuels to hydrogen and syngas, or $CO_2$ scrubbing of recycle streams in chemical conversion processes, such as recycle streams involved in ethylene oxide production, oxidative coupling of methane and ethane, or dimethyl ether production.

The partial pressure of $CO_2$ in the process gas to be treated with the sorbent of the invention can vary. A typical $CO_2$ partial pressure range for the process gas is about 1 to about 300 psia. In one embodiment, as exemplified in Example 5, the sorbent is effective at removing $CO_2$ from gaseous streams characterized by high temperature (e.g., greater than about 400° C. or greater than about 425° C.) and high partial pressure of $CO_2$ (e.g., greater than about 30 psia, greater than about 50, or greater than about 80 psia). However, the sorbent of the invention is also effective at process conditions associated with many types of exhaust gases; namely, moderately high temperatures (e.g., about 100 to about 450° C., more typically about 250° C. to about 375° C.) and low $CO_2$ partial pressure (e.g., less than about 20 psia, less than about 14 psia, less than about 10 psia, or less than about 5 psia, or less than about 3 psia).

The manner in which the sorbent material is contacted with the process gas can vary. Typically, the sorbent is housed within an absorber in a bed and the process gas passes through the bed. The bed of sorbent can be in a fixed bed or fluidized bed configuration using absorber and regenerator designs known in the art. If a fixed bed of sorbent is used, the system may include multiple sorbent beds in parallel arrangement such that beds in need of regeneration can be taken offline and regenerated. In this embodiment, the same vessel is used as both an absorber and a regenerator by simply changing the gas flowing through the vessel as well as the temperature and/or pressure in the vessel. In another embodiment, a fluidized bed of sorbent is used, and a separate absorber and regenerator in fluid communication can be used. In this embodiment, $CO_2$ loaded sorbent travels from the absorber to a separate regenerator vessel where $CO_2$ is stripped from the sorbent before the sorbent is transported back to the absorber in a continuous or semi-continuous flow.

The method used to regenerate the sorbent will vary, but will usually involve changing the temperature or pressure experienced by the bed of sorbent to facilitate release/desorption of the $CO_2$ bound in the mixed salt composition. Known methods of regenerating sorbents can be used, such as pressure-swing absorption (PSA), including vacuum swing absorption, temperature-swing absorption (TSA), or a combination thereof (e.g., combined TSA-PSA processes). Such regenerating processes involve one or more of raising the temperature or lowering the pressure applied to the sorbent to desorb $CO_2$ into an inert gas (e.g., nitrogen or steam) passing through the sorbent bed. In certain embodiments, the sorbent of the invention is capable of regeneration at a temperature of about 375 to about 450° C.

The sorbent will eventually become saturated with $CO_2$, and the level of $CO_2$ loading in the sorbent material can be determined by measuring and comparing the content of $CO_2$ in the process gas stream before and after contact with the sorbent. When it is evident that no further $CO_2$ is being removed from the process gas stream, the sorbent can be regenerated by, e.g., heating it to the desorption temperature. By measuring the amount of $CO_2$ contained in the concentrated $CO_2$ gas stream exiting the regenerating sorbent, the skilled artisan can determine when the sorbent is ready for reuse. The $CO_2$ gaseous stream produced by sorbent regeneration can be sequestered as known in the art or used as a raw material in processes requiring $CO_2$, such as in production of various chemicals; as a component of fire extinguishing systems; for carbonation of soft drinks; for freezing of food products; for enhancement of oil recovery from oil wells; and for treatment of alkaline water.

EXAMPLES

Example 1: Sorbent Prepared by Gelation

A sorbent comprising $MgO:Na_2CO_3:NaNO_3$ at a mass ratio of 75.8:16:8.2 was prepared as follows. An amount (395 g) of magnesium carbonate hydroxide ($4MgCO_3.Mg(OH)_2 \times H_2O$) was added to 800 ml of a solution of sodium carbonate (42.18 g) and sodium nitrate (21.63 g) dissolved in deionized water. The resulting mixed salt colloid was stirred for 30 minutes, covered, and allowed to sit overnight (up to 16 hours) at ambient temperature. Thereafter, the colloid was dried in an oven at 120° C. overnight (up to 16 hours) to form a dry cake.

The dry cake was then calcined by heating from 120° C. to 450° C., at a ramp rate of 3° C./minute, followed by holding at a temperature of 450° C. for 4 hours. The calcined cake was crushed and sieved to collect a 150-425 mesh fraction.

Example 2: Sorbent Prepared by Co-Precipitation

A magnesium-sodium mixed salt sorbent was prepared by precipitating a solid from two starting solutions. A first solution containing 233.4 g of $Na_2CO_3$ dissolved in 3000 ml deionized water was placed in a 5.0 liter plastic beaker, and stirred vigorously with a mechanical agitator. A second solution of 188.4 g $Mg(NO_3)_2:6H_2O$ in 500 ml of deionized water was pumped into the first solution at a rate of approximately 30 ml/minute. The resulting slurry was stirred for an hour and then covered and stored overnight under ambient conditions. Thereafter, the slurry was filtered using a vacuum-assisted Buchner funnel assembly to collect a wet precipitate cake. About 3200 ml of filtrate was collected and then dried in an oven at 120° C. for 24 hours to form a dry cake. The dried cake was then calcined, crushed and sieved as described in Example 1. A combination of inductively coupled plasma (ICP) analysis and elemental analysis (CHONS) was used to determine/estimate the molecular species composition of the calcined material. The sorbent was found to have an approximate mass composition of $MgO:Na_2CO_3:NaNO_3$ of 86.8:8.8:4.4 and a Mg:Na molar ratio of 9.8:1. An XRD pattern was collected for the calcined sorbent powder and the presence of $MgO$, $Na_2CO_3$, and $NaNO_3$ was clearly observed, as shown in FIG. 2, verifying that the prepared sorbent had the desired $MgO:Na_2CO_3:NaNO_3$.

Example 3: Carbon Dioxide Loading of Sorbent of Example 1

The amount of $CO_2$ loaded on the sorbent of Example 1 was evaluated using a simulated exhaust gas consisting of 13% $CO_2$, 13% $H_2O$, and balance $N_2$ (i.e., an exhaust gas with a $CO_2$ partial pressure of 1.9 psia) using a conventional, packed-bed reactor system equipped with a Horiba NDIR $CO_2$ analyzer to measure the concentration of $CO_2$ in the gas entering and exiting the reactor. The packed-bed reactor was loaded with 6 g of the prepared sorbent of Example 1 and a quantity of an inert, silicon carbide (SiC), to occupy the additional reactor volume. The reactor was then heated to 450° C. at 10° C./min in flowing $N_2$ to activate the sorbent and was held at this temperature until the $CO_2$ concentration in the reactor effluent dropped below 0.1%. The reactor was cooled to the lowest absorption temperature in flowing $N_2$. Once the reactor stabilized at the desired absorption temperature, the composition of the simulated feed gas (13% $CO_2$, 13% $H_2O$, bal. $N_2$) was verified by the $CO_2$ analyzer. When the $CO_2$ concentration was stable, +/−0.1% from set point, for a minimum of 5 minutes, the simulated exhaust gas was fed to the reactor feed. The $CO_2$ concentration of the reactor effluent was continuously measured by the $CO_2$ analyzer and the absorption phase of the cycle was continued until the $CO_2$ concentration in the effluent reached 90% of the previously measured feed concentration. This corresponds to a 90% breakthrough. At this point, the feed gas was changed to pure $N_2$ and the temperature for the reactor was ramped at 5° C./min to 450° C. The reactor was maintained at 450° C. until the $CO_2$ concentration in the reactor effluent decreased below 0.1 vol %, or a period of 2 hours was exceeded, indicating the completion of sorbent regeneration. The reactor temperature was then reduced to the desired absorption temperature, and the absorption-regeneration procedure described above was repeated.

FIG. 3 indicates the amount of carbon dioxide loaded on the sorbent over a range of temperatures from 200 to 425° C. in 25° C. increments. As shown, the test illustrates the effectiveness of the sorbent at absorbing $CO_2$ over a wide temperature range with a maximum loading at approximately 300° C.

Example 4: Carbon Dioxide Loading of Sorbent of Example 2

The $CO_2$ loading ability of the sorbent of Example 2 was analyzed using the same experimental process outlined in Example 3. FIG. 4 indicates the amount of carbon dioxide loaded on the sorbent of Example 2 over a range of temperatures from 100 to 425° C. As shown, the test illustrates the effectiveness of the sorbent at absorbing $CO_2$ over a wide temperature range with a maximum loading at approximately 350° C.

Example 5: Carbon Dioxide Loading of Sorbent of Example 1 Using High $CO_2$ Partial Pressure Process Gas The mixed salt sorbent described Example 1 was evaluated for removal of $CO_2$ from warm, high $CO_2$ partial pressure process gas streams. There are numerous examples of industrially-relevant process gas streams that can be described as warm, high $CO_2$ partial pressure process gas streams, such as desulfurized syngas, high-temperature and low-temperature shifted syngas, and $CO_2$-containing hydrogen.

In this example, simple gas mixtures containing $CO_2$ and $N_2$ with various $CO_2$ partial pressures were used to simulate warm, high $CO_2$ partial pressure process gas streams. $CO_2$ uptake and release measurements were made using a conventional, packed-bed reactor equipped with a Horiba NDIR $CO_2$ analyzer to measure the concentration of $CO_2$ in the gas entering and exiting the reactor. The packed-bed reactor was loaded with 4 g of the prepared sorbent of Example 1 and a quantity of an inert material (silicon carbide) was intermixed with the sorbent to occupy the remaining reactor volume. The reactor was then heated to 450° C. at 10° C./min in approximately 100 ml/min of $N_2$ to activate the sorbent and was held at this temperature until the $CO_2$ concentration in the reactor effluent dropped below 0.1%. The reactor pressure was then elevated to and maintained at 300 psia by a pressure control valve located downstream of the reactor. The reactor was cooled to the desired absorption temperature typically ranging between 375° C. and 450° C. Once the reactor stabilized at the desired absorption temperature, the composition of the simulated warm process gas, containing $CO_2$ and $N_2$, was verified by the $CO_2$ analyzer positioned downstream of the pressure control valve. When the $CO_2$ concentration was stable, +/−0.1% from set point, for a minimum of 5 minutes, the simulated process gas was fed to the reactor.

The $CO_2$ partial pressures evaluated ranged from 15 psia to 150 psia. The $CO_2$ concentration of the reactor effluent was continuously measured by the $CO_2$ analyzer and the absorption phase of the cycle was continued until the $CO_2$ concentration in the effluent reached 90% of the previously measured feed concentration. This corresponds to a 90% breakthrough. The amount of $CO_2$ absorbed by the sorbent, the $CO_2$ uptake, was determined by integration of the difference between the mass flow rates of $CO_2$ entering and exiting the reactor. Once 90% breakthrough had been reached, the feed gas was changed to either pure $N_2$ or a $CO_2/N_2$ mixture having lower $CO_2$ content than used in the absorption stage. The reactor temperature was either maintained at the absorption temperature or reduced to a lower temperature. The reactor remained in the regeneration stage until the $CO_2$ concentration in the reactor effluent decreased to <0.1 vol % greater than the $CO_2$ concentration in the feed stream. The reactor temperature and $CO_2$ concentration was then returned to the desired absorption conditions and the experiment could be repeated.

Results provided in FIG. 5 report the $CO_2$ loading capacity of the Mg—Na mixed salt sorbent as a function of $CO_2$ partial pressure and absorption temperature. Increasing the $CO_2$ partial pressure in the simulated warm process gas resulted in large increases in the $CO_2$ loading. In this study, the maximum $CO_2$ partial pressure evaluated was 150 psia, corresponding to a 50-50 mixture of $CO_2$ and $N_2$ with a total pressure of 300 psia. At this $CO_2$ partial pressure, the sorbent was capable of loading 52.2 wt % $CO_2$ and 49.6 wt % $CO_2$ at 430° C. and 450° C. respectively. For $CO_2$ partial pressures <20 psia $CO_2$, the sorbent did not absorb measureable quantities of $CO_2$ for either temperature evaluated. The shape of the $CO_2$ loading curve, having a rapid decrease in $CO_2$ loading with decreasing $CO_2$ partial pressure below 100 psia, is very promising for temperature-swing, pressure-swing, and partial-pressure swing absorption process arrangements and process arrangements consisting of combinations of temperature and pressure swing. These results also indicate that embodiments of the sorbent of the invention are useful for high temperature, high $CO_2$ partial pressure applications in addition to exhaust gas applications characterized by more moderate temperatures and very low $CO_2$ partial pressures.

Example 6: Regeneration of Sorbent of Example 1

The maximum $CO_2$ partial pressure that can be realized in the regeneration off-gas at a prescribed temperature was determined. In these experiments, the sorbent of Example 1 was loaded with $CO_2$ at 450° C. and a $CO_2$ partial pressure of 150 psia using an experimental system essentially as described in Example 5. The $CO_2$-loaded sorbent was then regenerated by cooling from 450° C. to the desired regeneration temperature without flow and once the desired temperature was reached, the feed gas was switched to 15 psia $CO_2$ balance $N_2$. The $CO_2$ content of the gas exiting the reactor was measured by a downstream NDIR $CO_2$ analyzer. Results presented in the table below report the maximum $CO_2$ partial pressure ($ppCO_2$) observed during regeneration of the sorbent at the indicated temperature in a regeneration gas having a $CO_2$ partial pressure of 15 psia. These results indicate the maximum $CO_2$ partial pressure that can be realized in the regeneration off-gas at the prescribed temperature. The maximum $CO_2$ partial pressure that can be realized during sorbent regeneration was found to decrease from 450° C. to 410° C. At 410° C., the sorbent was found to not regenerate at all and therefore, the maximum $CO_2$ partial pressure in the regeneration off-gas is less than 15 psia $CO_2$. These results indicate that the Mg—Na sorbent of Example 1 can be regenerated by in a partial pressure swing process combined with a negative temperature swing.

TABLE 1

| Regeneration Temperature [° C.] | Max. $ppCO_2$ [psia] |
|---|---|
| 450 | 44.0 |
| 440 | 38.0 |
| 430 | 19.5 |
| 420 | 17.0 |
| 410 | ≤15.0 |

Sorbent loaded at 450° C. in 150 psia $CO_2$. Total pressure: 300 psia.
$ppCO_2$ = $CO_2$ partial pressure Example 7: Effect of Alkali Element on Sorbent Performance The effect of the alkali element in the mixed salt sorbent was evaluated by preparing sorbents with the first three alkali earth metals in the Periodic Table of the Elements, specifically: Lithium (Li), Sodium (Na), and Potassium (K). The mixed salt sorbents were prepared following the same co-precipitation preparation and having the same Mg:Alkali Metal molar ratio of 1:6. The prepared sorbents were evaluated for the removal of $CO_2$ from simulated exhaust gas in a fixed-bed reactor system at the experimental conditions (temperature, gas composition, and gas hourly space velocity (GHSV)) provided in Table 2 below.

TABLE 2

| Absorption | |
|---|---|
| Temperature: | 100 to 450° C. |
| Gas Composition: | 13% $CO_2$, 13% $H_2O$, Bal. $N_2$ |
| GHSV: | 3,125 h$^{-1}$ |
| Regeneration | |
| Temperature: | Ramp to 450° C. at 10° C./min |
| Gas Composition: | $N_2$ |
| GHSV: | 2,500 h$^{-1}$ |

The effect of the alkali element on the performance of the mixed salt sorbent is illustrated in FIG. 6. These results suggest that the selection of the alkali element (e.g., Li, Na, K) can be used to tune the sorbent's window of operation. From these results, it appears that sorbents containing sodium (Na) provide the best operational temperature range for many applications, and such sorbents are also capable of achieving the highest $CO_2$ loading. However, sorbents containing Li or K were also shown to absorb carbon dioxide. The sorbent containing sodium absorbed $CO_2$ over a temperature range of about 100° C. to about 425° C., reaching a maximum at about 350° C. The sorbent containing lithium was most effective at 200° C. and showed absorption of $CO_2$ over a temperature range of about 200° C. to about 275° C., while the compound containing potassium absorbed $CO_2$ at a higher temperature ranging from about 300° C. to about 425° C. with a peak at about 350° C.

Example 8: Effect of Magnesium Source on Sorbent Performance (Co-Precipitation Method)

One of the preparation parameters that can affect the composition and performance of the sorbent is the source of magnesium, which can affect the salt species formed during precipitation. Since magnesium carbonate or magnesium oxide is the targeted magnesium compounds in the salt mixture, selection of the magnesium source that preferentially leads to the formation of these species is desired. In this study, the effect of the magnesium source of the performance of the mixed salt sorbent was evaluated by preparing sorbents from magnesium nitrate ($Mg(NO_3)_2$), magnesium oxide (MgO), and magnesium hydroxide ($Mg(OH)_2$). These sorbents were prepared following the same co-precipitation preparation procedure with a Mg:Na molar ratio of 1:6. The prepared sorbents were evaluated for the removal of $CO_2$ from simulated exhaust gas in a fixed-bed reactor system at the same experimental conditions (temperature, gas composition, and gas hourly space velocity (GHSV)) used in Example 7.

The effect of the magnesium source on the $CO_2$ loading as a function of temperature for the mixed salt sorbents is provided in FIG. 7. As can be seen, the sorbent prepared from magnesium nitrate achieved significantly greater $CO_2$ loadings than the oxide or hydroxide sorbents, indicating that the magnesium source has a significant impact on the performance of the sorbent. However, all three tested magnesium salts produced a sorbent that absorbed carbon dioxide. The primary difference between these magnesium sources is the solubility of the salt in water. For example, the solubility of magnesium nitrate in water is 125 g/100 ml, whereas the solubility of magnesium hydroxide is 1.2 mg/100 ml.

Although not bound by any particular theory of operation, although the same preparation procedure was followed, it appears that the resulting sorbent materials were formed via different pathways. The magnesium nitrate-prepared mixed salt was likely formed by the addition of a solution of sodium carbonate ($Na_2CO_3$) to a solution containing completely dissolved magnesium nitrate. Upon the addition of sodium carbonate, a white precipitate, the mixed salt, was formed. Precipitation likely occurred due to anion exchange between the magnesium and sodium cations in which a mixture of magnesium carbonate, hydroxide, and nitrate and sodium nitrate and carbonate was formed.

The sorbents made using magnesium oxide and hydroxide likely followed a different pathway due to their limited solubility in water. Following the same procedure, a solution containing sodium carbonate was slowly added to a solution containing a well-mixed slurry of magnesium hydroxide. Due to the presence of a precipitate, it was not possible to observe or distinguish the precipitation of a mixed salt species.

The $CO_2$ loading results indicate that the magnesium source, and specifically the solubility of the source compound in water, is a very important parameter in the preparation of a mixed salt sorbent with high $CO_2$ loading capacity. Although sorbent prepared using magnesium nitrate exhibited very good $CO_2$ loading capacity, other highly water soluble magnesium salts, such as magnesium chloride (54.3 g/100 ml) and magnesium acetate (39.6 g/100 ml), would also be useful for producing sorbents of the invention.

Example 9: Effect of Mg:Na Molar Ratio on Sorbent Performance

It is understood that $CO_2$ is loaded on the sorbent of the invention in the form of $MgCO_3$, which has been verified by XRD, and that the sodium species, although clearly involved in the $CO_2$ capture mechanism, do not store $CO_2$. Therefore, to more thoroughly understand the role of sodium in the $CO_2$ capture mechanism in the mixed salt sorbent, several sorbent samples were prepared with Mg:Na molar ratios in the reagent mixture ranging from 1:3 to 1:8. The sorbents were prepared following the same co-precipitation preparation procedure with the exception of the quantity of $Na_2CO_3$ used during the precipitation stage. The prepared sorbents were evaluated for the removal of $CO_2$ from simulated exhaust gas in the fixed-bed reactor system at the same experimental conditions (temperature, gas composition, and gas hourly space velocity (GHSV)) used in Example 7.

The experimental results presented in FIG. 8 indicate that the Mg:Na molar ratio does affect the $CO_2$ loading of the sorbent. For sorbents preparing using molar excesses of sodium (e.g., 1:6 and 1:8), the performance of the sorbent is consistent with previous findings. The $CO_2$ loading capacity increases with absorption temperature, passes through a maximum of approximately 13 wt % $CO_2$ at 350° C., and rapidly decreases with increasing absorption temperature. Increasing the sodium molar excess from 6 to 8 appears to have little effect on the general shape of the absorption curve. The peak $CO_2$ loading is approximately 12 wt % at 350° C. for both materials, and both exhibit rapid decrease in $CO_2$ loading with increasing temperature. The only observable difference is a slight decrease in the $CO_2$ loading for temperatures below 350° C. for the sorbent with a larger quantity of sodium.

Decreasing the sodium content to 1:4 and below (e.g., 1:3) appears to significantly affect the $CO_2$ loading profile. Although, the sorbent having an equimolar Mg:Na ratio achieved the lowest $CO_2$ loading of the sorbents evaluated, it exhibited peak loading at 250° C. Thus, decreasing the sodium content of the sorbent to a Mg:Na ratio of 1:3 resulted in a significant increase in $CO_2$ loading at 250° C. Shifting the peak $CO_2$ loading from 350° C. to 250° C. by reducing the sodium content of the sorbent is a significant and promising finding. This finding suggests that $CO_2$ interacts with the mixed salt sorbent via different mechanisms, and that the mechanism and ultimately the window of operation can be affected by adjusting the composition.

Example 10: Effect of Precipitation Solution Concentration on Sorbent Performance One of the preparation parameters that can affect the performance of the sorbent is the concentration of the precipitating solution. In this study, mixed salt sorbents having the same composition at four precipitation solution concentrations (0.05, 0.1, 0.2, and 0.3M) were prepared. These sorbents were prepared following the same co-precipitation preparation procedure with a Mg:Na molar ratio of 1:6. The prepared sorbents were evaluated for the removal of $CO_2$ from simulated exhaust gas in a fixed-bed reactor system at the same experimental conditions (temperature, gas composition, and gas hourly space velocity (GHSV)) used in Example 7.

The effect of the precipitation solution concentration on the $CO_2$ loading as a function of temperature for the mixed salt sorbents is illustrated in FIG. 9. The concentration of the precipitation solution has a significant effect on the performance of the sorbent. Decreasing the concentration of the precipitating solution results in a lowering of the peak loading temperature from 350° C. to between 250 and 275° C. In addition to shifting the peak loading temperature, the quantity of $CO_2$ loaded increased from 12 wt % to approximately 20 wt %. The performance of the sorbents prepared from low concentration solutions is particularly interesting, as those sorbents achieved both greater $CO_2$ loading and peak loading at lower temperatures.

Example 11: Effect of Precipitating Agent on Sorbent Performance

This study evaluated the role of the precipitating agent on the performance of the mixed salt sorbent. Two precipitating agents were evaluated: sodium carbonate ($Na_2CO_3$) and ammonium carbonate ($(NH_4)_2CO_3$). The samples were prepared using slightly different co-precipitation techniques. The first sample was prepared by slowly adding a solution of sodium carbonate to a solution of magnesium nitrate. The second sample was prepared by slowly adding a solution of ammonium carbonate to a mixture of magnesium nitrate and sodium nitrate. These sorbents were prepared with a Mg:Na molar ratio of 1:6. The prepared sorbents were evaluated for the removal of $CO_2$ from simulated exhaust gas in a fixed-bed reactor system at the same experimental conditions (temperature, gas composition, and gas hourly space velocity (GHSV)) used in Example 7.

The effect of the precipitating agent on the $CO_2$ loading as a function of temperature for the Mg-Alkali mixed salt sorbents is provided in FIG. 10. The performance of the prepared materials is significantly different. The sodium carbonate prepared material exhibits a broad absorption curve, whereas the ammonium carbonate prepared sorbent has a narrower temperature range over which absorption of $CO_2$ was observed with a sharp spike appearing at about 300° C. These results suggest that the precipitating agent has an effect on the performance of the mixed salt sorbent, which may be useful to exploit for specific applications requiring a narrow absorption temperature range.

Example 12: Compositional Analysis of Sorbents Prepared by Co-Precipitation Method Several mixed salt sorbent compositions were prepared at different precipitation solution concentrations according to the general process set forth in Example 2. A combination of inductively coupled plasma (ICP) analysis and elemental analysis (CHONS) was used to determine/estimate the molecular species composition of each prepared, co-precipitation sorbent. The weight percentages of each component of the sorbents were estimated by combining results from these analyses and the results are present in Table 3 below. Results indicated that reducing the co-precipitation concentration (0.2 M→0.05 M) resulted in a higher MgO content in the sorbent and a decrease in the $NaNO_3$ content. It should be noted that the sorbent materials were prepared at a constant pH.

TABLE 3

| Sample | MgO | $Na_2CO_3$ | $NaNO_3$ |
|---|---|---|---|
| 0.05M | 84.59 | 14.12 | 1.29 |
| 0.1M | 81.72 | 12.08 | 6.20 |
| 0.2M | 75.81 | 15.99 | 8.02 |

Example 13: Comparison of Performance of Sorbent Produced by Co-Precipitation Process and Gelation/Colloid Process A mixed salt sorbent of the invention was prepared having the same composition as the 0.05 M sample shown in Table 3 above using both the co-precipitation method and the gelation/physical mixing method set forth herein, and evaluated for $CO_2$ capture performance at the conditions given in Example 7. The effect of preparation method on the $CO_2$ capture performance of the sorbent, having the same elemental composition, is provided in FIG. 11. It is evident that the two sorbents have very similar $CO_2$ loading curves, with both materials achieving approximately 20 wt % $CO_2$ loading at 275° C. to 300° C., with a very rapid decrease in loading with increasing absorption temperature. The similarity in the $CO_2$ loading curves indicates that the sorbents prepared by different preparation techniques have very similar $CO_2$ capture properties and that the desired characteristics of the best-performing sorbent prepared by co-precipitation can be retained when prepared by the physical mixing/gelation method.

Example 14: Effect of Magnesium Source on Sorbent Performance (Gelation Method)

As noted in Example 1, basic magnesium carbonate (magnesium carbonate hydroxide) was the MgO source in the gelation/physical mixture sorbent. One issue with basic magnesium carbonate is that it has very low bulk density and is more expensive than commercially-available magnesium oxide. Two physical mixture samples were prepared using powdered MgO and nano-MgO as the MgO source having the same composition as the sorbent prepared using basic magnesium carbonate in Example 1 to determine if less expensive, commercially-available magnesium oxides can be used. These sorbents were evaluated for $CO_2$ capture performance at the conditions given in Example 7.

The magnesium source was found to have a significant effect on $CO_2$ loading capacity of the mixed salt sorbent, as seen by results presented in FIG. 12. The sorbents prepared with magnesium oxide were unable to achieve a $CO_2$ loading in excess of 5 wt % $CO_2$ and showed a decreasing $CO_2$ loading capacity with increasing absorption temperature. The MgO-based materials did not show the characteristic "volcano" shape that was observed for the mixed salt sorbent. From these results, it appears that basic magnesium carbonate should be used as the magnesium source in the gelation process.

Example 15: Effect of Drying Method on Sorbent Performance

Two drying methods were evaluated for drying the wet sorbent material formed in the production method to determine if the drying method affects the performance of the sorbent. The two tested methods were: 1) oven drying of a wet filter cake; and 2) direct spray drying of the sorbent material. Two sorbent batches having the same composition were prepared via the spray dryer and filtering/oven drying methods. The $CO_2$ capture performance of each sorbent was evaluated at the experimental conditions given in Example 7.

The $CO_2$ capture performance of the sorbent prepared via the spray drying and filtering/oven drying methods are presented in FIG. 13. These results clearly indicate that the spray drying method yields a superior $CO_2$ capture sorbent. The spray-dried material exhibited ~5 wt % higher $CO_2$ loading at all capture temperatures <300° C., compared to the filter/oven dried material. However, the filtered/oven dried sorbent exhibited very good $CO_2$ performance as well, achieving ~18 wt % $CO_2$ loading at 300° C.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for removing carbon dioxide from a gaseous stream, comprising contacting a gaseous stream containing carbon dioxide with a sorbent material comprising a mixed salt composition in solid form comprising:
   i) magnesium oxide;
   ii) an alkali metal carbonate; and
   iii) an alkali metal nitrate, wherein the composition has a molar excess of magnesium characterized by a Mg:X atomic ratio of at least about 1.1:1, wherein X is the alkali metal.

2. The method of claim 1, wherein the contacting step occurs at a temperature of about 100° C. to about 450° C.

3. The method of claim 1, wherein the contacting step occurs at a temperature of about 250° C. to about 375° C.

4. The method of claim 1, wherein the carbon dioxide pressure in the gaseous stream is about 1 to about 300 psia.

5. The method of claim 1, wherein the carbon dioxide pressure in the gaseous stream is less than about 5 psia.

6. The method of claim 1, wherein the sorbent material is contained within a fixed bed or fluidized bed absorber.

7. The method of claim 1, wherein the sorbent material exhibits a $CO_2$ loading of at least about 10 weight percent $CO_2$ at an absorption temperature of about 250 to about 350° C.

8. The method of claim 1, wherein the alkali metal comprises sodium.

9. The method of claim 1, wherein the Mg:X atomic ratio is at least about 4:1.

10. The method of claim 1, wherein the Mg:X atomic ratio is at least about 6:1.

11. The method of claim 1, wherein the alkali metal nitrate is present in an amount of at least about 1% by weight, based on total dry weight of the mixed salt composition.

12. The method of claim 1, wherein the mixed salt composition comprises $MgO:Na_2CO_3:NaNO_3$, wherein the atomic ratio of Mg:Na is at least about 1.1:1.

13. The method of claim 1, wherein the mixed salt composition has a crush strength in pellet form, as determined by the Shell method, of at least about 0.3 MPa.

14. The method of claim 1, further comprising the step of regenerating the sorbent material using pressure-swing absorption, vacuum-swing absorption, temperature-swing absorption, or a combination thereof to cause desorption of carbon dioxide.

15. The method of claim 14, wherein the regenerating step comprises at least one of raising the temperature of the sorbent material and lowering the pressure applied to the sorbent material, as compared to the temperature and pressure during the contacting step.

* * * * *